Nov. 19, 1963
T. PROCTOR
3,111,558
RELAY CIRCUIT
Filed May 26, 1960
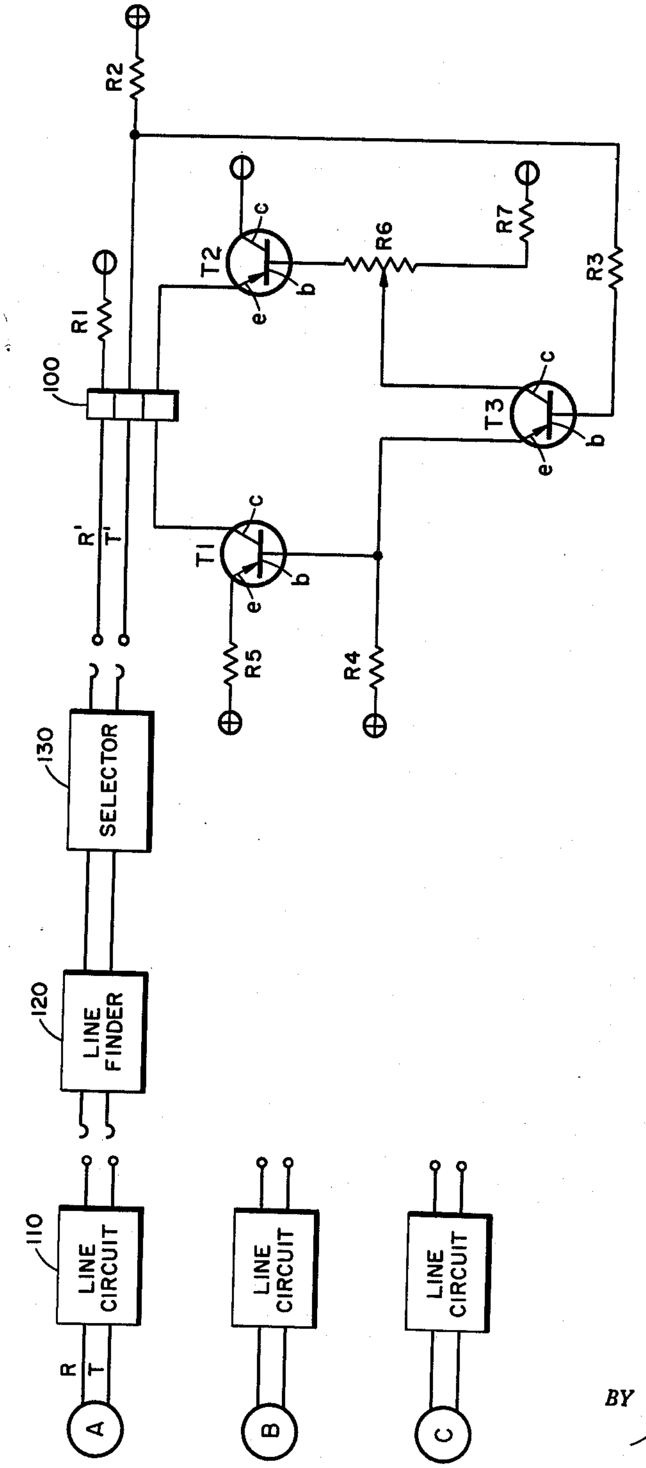
INVENTOR.
THOMAS PROCTOR
BY
George W. Killian
AGENT United States Patent Office 3,111,558

Patented Nov. 19, 1963

3,111,558
RELAY CIRCUIT

Thomas Proctor, Webster, N.Y., assignor to General Dynamics Corporation, Rochester, N.Y., a corporation of Delaware Filed May 26, 1960, Ser. No. 32,033
11 Claims. (Cl. 179—16)

This invention relates in general to relay operating circuits and, more particularly, to a circuit for operating a relay over a wide range of available current.

Although the invention herein disclosed is suitable for more general application, it is particularly adapted for use in automatic telephone systems or the like wherein it is necessary to provide relays which respond to the opening and closing of circuits of various impedance. For example, dial telephone systems employ pulsing relays to respond to the operation of subscriber dials which alternately open and close the variable length and impedance loops between a subscriber's dial and the associated pulsing relay. Although it is customary to design pulsing relays to respond to signal currents which may vary by a factor of six-to-one, it is desirable to be able to operate over a larger ratio and/or to produce more uniform output pulses over the range of signal currents.

It is the general object of this invention to provide a new and improved circuit for operating relays.

It is a more particular object of this invention to provide a circuit for reliably and uniformly operating a relay over a wide range of operating signals.

In accordance with the present invention, an auxiliary winding on the relay is provided and, by means of gating transistors, a current is permitted or inhibited therein in accordance with the magnitude of the current in a primary winding. In order to maintain uniform operation of the relay over a wide range of current values in the primary winding, provision is made to inhibit the current in the auxiliary winding in response to the current in the primary winding exceeding a predetermined value. In order to prevent the false operation of the relay which might result from leakage currents, the current in the auxiliary winding is inhibited until the current in the primary winding exceeds a different predetermined value.

In summary, the present invention provides a circuit which permits current flow in an auxiliary winding of a relay only when the current flow in a primary winding is within predetermined limits. At all other times, any current flow in the auxiliary winding is inhibited. Accordingly, when the current in the primary winding is within predetermined limits, a current will flow in the auxiliary winding; and in accordance with the relative direction of the primary and auxiliary currents, the relay may be assisted or inhibited in its operation.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which comprises a single figure on one sheet.

*General Description*

It is to be understood that only the details of the circuit necessary to understand the invention have been shown. For example, line circuits, a linefinder, and a selector have been shown in block diagram form to illustrate a typical application for this invention in a telephone system. However, the invention may be used in other settings, or for other applications in telephone systems. For example, the invention might be used in connection with a ring trip relay operation rather than a pulsing relay operation. Or the invention might be used in connection with an alarm type of relay operation wherein, in response to the primary winding current exceeding a predetermined value, the current in a differentially connected auxiliary winding is cut off and the relay allowed to operate. The number of instances in which the present invention could find application is obviously large and the particular application shown in FIGURE 1 is intended only as a typical illustration.

It is believed that the operation of the circuit may best be understood by tracing the operation of relay 100 in a typical application. In a telephone system, a relay, such as relay 100, is typically connected to, and controlled by, a calling subscriber's dial as the calling subscriber dials the directory number of the desired called party. A dial at a subscriber's telephone consists of a pair of normally closed contacts which open and reclose a number of times corresponding to the value of the digit dialed. During dialing, the dial contacts are connected directly across the two wires leading from the telephone exchange to the subscriber's telephone.

As is well known, in the step-by-step telephone art, when a subscriber at a station, such as station A, lifts his handset to originate a telephone call, a loop is closed between the T and R leads and, in response thereto, a metallic connection is completed over these two wires through a line circuit 110 and a linefinder 120 to a selector 130. In response to a dialed digit, the selector may complete a metallic circuit on the two wires to another circuit including a relay 100 which is thereafter responsive to subsequent dial pulses.

Other subscribers, such as those at stations B or C, may also originate calls by similar operation. The length and resistance of the loops between the line circuit 110 at the telephone exchange and the subscriber's premises may vary widely depending upon the area served by the exchange. The D.C. loop resistance may vary from practically zero, for a subscriber who lives close to the exchange, to values considerably exceeding 1000 ohms, for subscribers who live at more remote locations. Obviously, the value of the current through the relay 100 and the loop to the originating subscriber, which is extended through line circuit 110, the linefinder 120, and selector 130, is determined by the resistance of the subscriber's loop. The magnetic structure of relay 100 will be more saturated when larger currents flow in the upper windings than when reduced currents flow therein. The operating characteristics of the relay which depend upon various factors, including the current and the saturation of the magnetic circuit, will, therefore, be affected by the resistance of the connected subscriber's loop.

It is desirable to maintain the operating characteristics of the relay 100 in as narrow a range as possible while permitting the range of tolerable current in the subscriber's loop as wide a range as possible. The present invention provides means for achieving these desired results by providing an auxiliary winding on relay 100 and providing means for inhibiting current in the auxiliary winding unless a current within predetermined limits is flowing in the upper windings. Thus, when relatively low current flows in the upper windings, a current flows in the auxiliary winding to augment the operating effect of the upper windings. However, when the current in the upper windings of relay 100 is above a predetermined value, the current in the auxiliary winding is cut off. As a consequence, the operating characteristics of relay 100 may be maintained in a narrower range than heretofore, or, alternatively, while operating relay 100 in the same range of operating characteristics the range of permissible currents may be expanded.

The foregoing discussion assumes that the auxiliary winding is connected in an aiding relationship with the other windings. For some operating requirements it may be desirable to connect the auxiliary winding in an opposing relationship to the other windings.

*Detailed Description*

It will be observed that relay 100 may be energized by a flow of current from the positive terminal of a D.C. power supply, represented symbolically as (+), through resistor R2, the middle winding of relay 100 to lead T', then by suitable means to lead R', the upper winding of relay 100 and resistor R1 to the negative terminal of the D.C. power supply, represented symbolically as (−). The device used to connect the T' and R' leads may be used to control the current and the magnitude of the current through relay 100. During the time that no current is flowing in the above-identified circuit, the base of transistor T3 will assume the potential of the positive terminal of the D.C. power supply. Hereafter, for convenience and in accordance with standard telephone terminology, the positive terminal of the power supply will be referred to as "ground" while the negative terminal will be referred to as "battery." With the base of transistor T3 at ground potential, no current will pass from the emitter electrode to the collector electrode of transistor T3 as the emitter thereof is also held at ground potential by ground connected resistor R4. In a similar manner, since no current flows from the electrode to the collector electrode of transistor T3, there is no current in resistor R4 and consequently the base of transistor T1 is held at ground potential and no emitter current flows in transistor T1. However, it will be observed that while no current flows in the emitter circuit of transistor T2 that the base of transistor T2 is held at a negative potential by the battery connected resistor R7.

If it is now assumed that leads T' and R' are connected together through a relatively large resistance, it will be apparent that the current flow through resistor R2 causes the base of transistor T3 to be reduced to a slightly negative potential with respect to its emitter and thereby permits a current to flow from ground at resistor R4 through the emitter and collector electrodes of transistor T3 to battery at resistor R7. In a similar manner, the current through resistor R4 causes transistor T1 to be biased "on" and a current flows from ground connected resistor R5 through the emitter and collector electrodes of transistor T1, the auxiliary winding of relay 100, and the emitter and collector electrodes of transistor T2 to battery. The current in the auxiliary winding, which is produced in response to the current in the upper windings, adds to the effect of the current in the upper windings in operating the relay 100.

If the resistance connecting the T' and R' leads is materially reduced, the flow of current through resistor R2 and the upper windings of relay 100 will be correspondingly increased. The increased current through resistor R2 will cause the base potential of transistor T3 to be reduced, thus passing a larger current between the emitter and collector electrodes and thereby saturating this transistor. The resulting increased current through adjustable resistor R6 and resistor R7 will raise the base potential of transistor T2, thereby cutting off the current flow from the emitter to the collector electrode of transistor T2 and eliminating the current in the auxiliary winding of relay 100. Thus, in response to the current in the upper windings exceeding a predetermined value, the current in the auxiliary winding may be cut off. From the foregoing description it may be seen that a circuit is provided which, in response to the current in one winding being within predetermined limits, permits current flow in an auxiliary winding while, when the current in said one winding is outside said predetermined limits, current flow in the auxiliary winding is inhibited.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of this invention.

What is claimed is:

1. In a telephone system comprising a plurality of lines, a relay having first and second windings, switching means for completing a first electrical circuit through a selected one of said lines and said first winding on said relay, and control means responsive to a steady current of a first predetermined magnitude in said first winding for producing a flow of current of a second predetermined magnitude in a second electrical circuit including said second winding and for increasing the magnitude of current in said second winding when the magnitude of current in said first winding increases above said first predetermined magnitude.

2. The system as set forth in claim 1 wherein said controlling means includes means for permitting the flow of current through said second winding only when the current through said first winding is within predetermined limits.

3. The system as set forth in claim 1 wherein said control means includes means for inhibiting the flow of current in said second winding only when the current in said first winding is outside predetermined limits.

4. In combination, a relay including first and second windings, switching means for completing a first circuit through said first winding, and means for permitting the flow of current through a second circuit including said second winding only when the current through said first circuit is within predetermined limits.

5. In combination, a relay including first and second windings, switching means for completing a first circuit through said first winding, and means for inhibiting the flow of current through a second circuit including said second winding only when the current through said first circuit is outside predetermined limits.

6. In combination, a relay with a plurality of windings, a source of D.C. potential, and a plurality of devices each having a current emissive electrode, a control electrode, and a current collecting electrode, means for passing current through a first winding on said relay, means for passing current through a series circuit including a second winding on said relay, said source of D.C. potential, the current emissive electrodes, and the current collecting electrodes of two of said devices, means responsive to the current in said first winding being below a predetermined value for biasing the control electrodes of said devices in a manner to inhibit the flow of current in said second winding, and means responsive to the current in said first winding being above said predetermined value for biasing the control electrodes of said devices in a manner to permit the flow of current in said second winding.

7. The combination as set forth in claim 6 and including means responsive to the current in said first circuit being a predetermined amount greater than said predetermined value for biasing the current control electrodes of said devices in a manner to inhibit the flow of current in said second circuit.

8. In combination, a relay with a plurality of windings, a source of D.C. potential, and a plurality of devices each having a current emissive electrode, a control electrode, and a current collecting electrode, means for passing current through a first winding on said relay, means for passing current through a series circuit including a second winding on said relay, said source of D.C. potential, the current emissive electrodes, and the current collecting electrodes of two of said devices, and means for permitting the flow of current in said second winding only when the current in said first winding is within predetermined limits.

9. In combination, a relay including first and second windings, first and second devices each having a current emitting electrode, a control electrode, and a current collecting electrode, a first circuit through said first winding on said relay, a second circuit through said second winding on said relay and including the current emissive electrodes and the current collecting electrodes of said first and second devices all in series, means responsive to the current in said first circuit being below a predetermined value for rendering the first one of said devices non-conducting, and means responsive to the current in said first circuit being above said predetermined value for rendering the first one of said devices conducting.

10. The combination set forth in claim 9 and including means responsive to the current in said first circuit being a predetermined amount above said predetermined value for rendering the second one of said devices non-conducting.

11. In combination, a relay including first and second windings, first, second, and third devices each having a current emissive electrode, a current collecting electrode, and a control electrode, a source of D.C. potential, an impedance element, a first series circuit from one terminal of said potential source through said impedance and said first winding of said relay to the other terminal of said potential source, a second series circuit from one terminal of said potential source through said second winding of said relay, the current emissive electrodes and the current collecting electrodes of said first and second devices to the other terminal of said potential source, means for connecting the control electrodes of said first and second devices to the current emitting electrode and the current collecting electrode, respectively, of said third one of said devices, and means for connecting the control electrode of said third one of said devices to the terminal of said impedance not connected to said potential source whereby the rate of flow of current in said second circuit is controlled by the rate of flow of current in said first circuit.

References Cited in the file of this patent

UNITED STATES PATENTS

| | | |
|---|---|---|
| 1,243,221 | Reed | Oct. 16, 1917 |
| 2,801,374 | Svala | July 30, 1957 |
| 2,975,337 | Cleary | Mar. 14, 1961 |